United States Patent [19]

Drum

[11] Patent Number: 4,529,654

[45] Date of Patent: Jul. 16, 1985

[54] SUPPORT FOR TRANSFER IMAGES OR SLIDE-OFF IMAGES

[75] Inventor: Henner Drum, Rhodt, Fed. Rep. of Germany

[73] Assignee: Hoffman & Engelmann AG, Neustadt/Weinstrasse, Fed. Rep. of Germany

[21] Appl. No.: 593,090

[22] Filed: Mar. 26, 1984

[30] Foreign Application Priority Data

Mar. 30, 1983 [DE] Fed. Rep. of Germany ....... 3311728

[51] Int. Cl.[3] ............................................ B32B 23/08

[52] U.S. Cl. .................................... 428/340; 156/234; 156/240; 427/149; 428/202; 428/211; 428/342; 428/511; 428/537.5; 428/914

[58] Field of Search ............... 428/211, 914, 201, 340, 428/342, 537.5, 511; 156/240, 234, 230; 427/149

[56] References Cited

U.S. PATENT DOCUMENTS

| | | | |
|---|---|---|---|
| 2,970,076 | 1/1961 | Porth | 156/240 X |
| 3,128,197 | 4/1964 | Goebel | 427/149 X |
| 3,669,704 | 6/1972 | Reiling | 428/211 X |
| 4,049,860 | 9/1977 | Armbrust et al. | 428/201 |
| 4,175,151 | 11/1979 | Eppich et al. | 428/211 X |

OTHER PUBLICATIONS

European Search Report, No. EP 84103093, two pages, Jun. 1984.

*Primary Examiner*—Thomas J. Herbert

*Attorney, Agent, or Firm*—Schwartz, Jeffery, Schwaab, Mack, Blumenthal & Evans

[57] ABSTRACT

A support is disclosed for transfer images or slide-off images, composed of absorbent paper with an applied barrier layer and a water-soluble separation layer for receiving an image layer, whereby the separation layer applied to said support comprises a homo- or copolymer of acrylic acid and/or a copolymer of alkylvinyl ether and maleic acid anhydride.

8 Claims, 1 Drawing Figure

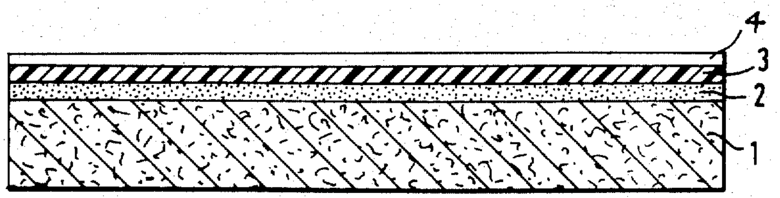
4
3
2
1

SUPPORT FOR TRANSFER IMAGES OR SLIDE-OFF IMAGES

BACKGROUND OF THE INVENTION

The present invention relates to a support for transfer images or slide-off images, e.g., decals, composed of absorbent paper, one side of which supports an applied barrier layer and a water-soluble separation layer for receiving a detachable image layer in the form of a print and/or lacquer layer.

Supports for transfer images or slide-off images are known, for example, from German Offenlegungsschrift No. 25 51 860, corresponding to U.S. Pat. No. 4,049,860, or from U.S. Pat. No. 2,970,076. They disclose a water-soluble or heat-soluble separation layer, to which the decorative image is printed by means of screen printing or offset printing. During the transfer of the decorative image to the intended carrier, which can be performed manually or mechanically, a residual amount of the separation layer constituents is simultaneously transferred in all process methods. In general, the separation layer is composed of gum arabic, polyvinyl alcohol, carboxymethyl cellulose, polyvinyl acetate, polyglycols or oligosaccharides or polysaccharides.

It is an important characteristic of these co-transferred separation layer constituents that they burn without leaving any residue during the subsequent burning-in of the decorative image which in most cases is composed of mixtures of inorganic pigments and a lacquer mask.

If the carriers are glass or ceramic objects with an underglaze and the process is carried out in a conventional manner in the presence of water-soluble separation layer constituents and at high burning-in temperatures, decorative final products which are absolutely free of tint, are obtained.

The co-transfer of large amounts of water-soluble separation layer constituents is disadvantageous, above all in cases where they are transferred to unglazed ceramic objects or where critical burning-in methods, such as fast burning-in, or lower burning-in temperatures are used. In these cases, permanently visible, undesired remnants of the separation layer constituents are left after the burning-in.

Transfer images or slide-off images which are not used in the ceramic field are also known. After having been transferred to glass, metal, enamel, plastic, etc., these images are fixed at temperatures of up to 250° C., whereby the lacquer mask surrounding the decorative image is maintained. It is a substantial disadvantage of the known separation layers that co-transferred separation layer constituents dissolve due to the attack of water on the carrier and reduce or neutralize the adhesion of the decorative image. It is, of course, also possible to produce images of this kind by means of reverse side printing, which presents the advantage that a heat-activatable adhesive is applied during the last working step. After the heat treatment these images permanently adhere to the carrier. It is, however, a disadvantage that after the transfer the image can no longer be positioned manually, since no water-soluble, slidable separation layer is present between the decorative image and the carrier. In cases where the carrier is irregularly shaped, this disadvantage is particularly serious.

SUMMARY OF THE INVENTION

It is therefore an object of the present invention to provide a support for transfer images or slide-off images, which comprises a water-soluble separation layer, and is suitable for applying a decorative image to objects made of, for example, enamel, glass, stainless steel, or a porous ceramic material.

Another object of the invention is to provide a support suitable for applying a decorative image to objects having, for example, plastic surfaces where the decorative image is merely fixed.

Still another object of the invention is to provide a support in which any co-transferred separation layer components will burn completely, even at relatively low burning-in temperatures, thereby leaving an image completely free of tinting due to carbon black particles.

Yet another object of the invention is to provide a support which can be used for a water-soluble coating wherein the residual co-transferred separation layer components, during the subsequent fixing of the decorative image, are converted into a water-insoluble state.

In accomplishing the foregoing objects, there has been provided in accordance with the present invention a support for transfer images or slide-off images comprising an absorbent paper base layer, a barrier layer applied to one side thereof, and a water-soluble separation layer applied to the barrier layer. The separation layer comprises a homopolymer or copolymer of acrylic acid and/or a copolymer of alkylvinyl ether and maleic acid ahydride, and may further comprise a mixture of an acrylic acid polymer and a polysaccharide, particularly dextrin.

Further objects, features and advantages of the present invention will become apparent from the detailed description of preferred embodiments which follows, when considered together with the attached FIGURE of drawing.

BRIEF DESCRIPTION OF THE DRAWING

The FIGURE shows a cross-section of a support transfer image or slide-off image according to the present invention, wherein item 1 is the paper support, item 2 is the barrier layer, item 3 is the separation layer, and item 4 is the image layer.

DETAILED DESCRIPTION OF PREFERRED EMBODIMENTS

These objects are achieved by a support for transfer images or slide-off images of the type mentioned at the outset, wherein the separation layer comprises a homo- or co-polymer of acrylic acid and/or a copolymer of alkylvinyl ether and maleic acid anhydride. Preferably, the separation layer comprises a mixture of a homo- or co-polymer of acrylic acid or a copolymer of methylvinyl ether and maleic acid anhydride, and a polysaccharide, in particular dextrin.

This achieves the result that the appearance of the final product and the final adhesion of the decorative image are no longer adversely affected due to the transfer of the decorative image from its support to porous ceramic carriers where, for example, critical buring-in processes are employed, or to carriers which are merely subjected to a subsequent fixing process. The decorative images obtained on the carriers are free of tint and they are not easily detached by the action of moisture or water. After the transfer to, for example, unglazed ceramic objects and after the burning-in, during which the lacquer mask burns, clean decorative images are obtained, also in cases where a considerable amount of separation layer constituents has been co-transferred. If the decorative image is transferred to a carrier where it is merely fixed, i.e., the lacquer mask is maintained, which with customary processes involves the risk that the decorative image is detached due to the attack of water, because water-soluble constituents of the separation layer have been co-transferred, this negative effect can be avoided by the process in accordance with this invention.

The present invention achieves the further advantage that a support for transfer images or slide-off images is made available, which fulfills the demands on supports for decorative images which are to be used for residue-free decorations and can also be used for a water-soluble coating, including the subsequent fixing of the decorative image, during which the residual separation layer constituents are converted into a water-insoluble state.

Homo- or co-polymers of acrylic acid, which can be used alone or in a mixture, have been found to be suitable materials for the separation layer. The homopolymers have molecular weights of between about 2,000 and about 250,000. Suitable copolymers are, for example, copolymers of acrylic acid and esters of acrylic or methacrylic acids. There molecular weights vary within a range of from about 30,000 to about 260,000. These products are commercially available.

It has been found that the homo- and co-polymers of acrylic acid have excellent buring properties and to a large extent burn or decompose at low temperatures, without leading to an extraordinarily high carbon black deposit.

The homo- or co-polymers are preferably employed as a mixture with conventional, known substances which are suitable for use in separation layers. These include the substances mentioned at the outset. Special preference is thereby given to mixtures with polysaccharides, in particular dextrin. For an optimum embodiment of the invention it has provded advantageous to use a separation layer which contains at least 50% by weight of homo- or co-polymer.

Separation layers which are composed of a mixture of homo- or co-polymers of acrylic acid and dextrin can be used for the decoration of unglazed ceramic carriers. After the burning-in process, no residues are left in the non-image areas.

Copolymers of alkylvinyl ether and maleic acid anhydride, and in particular of methylvinyl ether and maleic acid anhydride, have also been found to be well suited materials for the separation layer of the invention. These products are commercially available. Their molecular weights are within a range of from about 50,000 to about 200,000, and they are water-soluble. In the form of mixtures with substances carrying reactive groups, such as, for example, oligo- or poly-saccharides, vinylpyrolidone-containing polymers, polyvinyl alcohol, alkylamine, polyalkyl-polyamine or other substances with poly-functional groups, they are particularly well suited for separation layers, to which decorative images are applied which are separated from their intermediate support with water for being transferred to their final carrier and which cannot be subjected to a subsequent burning-in process. It has been observed that at the applied fixing temperatures the co-transferred separation layer constituents crosslink and are converted into a water-insoluble or at least difficultly water-soluble state. Thus, the decorative image applied to the carrier is rendered insensitive to the action of moisture or water. Separation layer mixtures which contain at least 50% by weight of the polymer or copolymer of the invention can be used particularly successfully.

Mixtures of homo- or co-polymers of acrylic acid and copolymers of alkylvinyl ether and maleic acid anhydride can also be used for the separation layers according to the invention. Depending on the respective mixing ratio, preferably in combination with dextrin, it is thus possible to obtain different separation and float-up times of the images, which is of particular importance if the application if effected mechanically. Thus, simple and relatively inexpensive separation layers can be produced, which are suitable for use in many different fields of application.

The invention is more fully explained by reference to the attached FIGURE of drawing. This shows a diagrammatically represented cross-section of a support for transfer images or slide-off images. Reference numeral 1 identifies the paper support, having an average weight per unit area in the range from about 100 up to 200 $g/m^2$. The paper support contains a barrier layer 2 which renders one surface of the paper support less porous. The barrier layer can represent a superficial sizing or a sealable coat, for example, of starch, casein, glue, alkali metal silicate, water glass and the like, with or without a clay filler. The presence of the barrier layer 2 prevents excessive penetration and absorption of the material according to the invention which is to be applied for the separation layer 3.

The separation layer 3, composed of the materials described above, is applied on top of the barrier layer, using suitable applicator means. The matter is to be applied such that the dry weight is about 6 to 15 $g/m^2$. Drying is performed at about 80° C., in a channel drier.

The image layer 4 is a detachable cohering lacquer mask or lacquer containing the decorative image composed of, for example, inorganic pigments.

To prepare the separation layer solution, first the individual components are dissolved in water. Dextrin is sprinkled into cold water and dissolved under moderate stirring. Polyacrylic acid is commercially available in the form of a solution. The acrylic acid/acrylic acid ester (PAA/PAE) copolymer is dissolved in water at 70° C. by neutralizing, for example, by adding 23 parts of triethanolamine to 100 parts of copolymer.

The methylvinyl ether/maleic acid anhydride (PVE/MA) copolymer is dissolved in water at 95° C. while stirring. The following procedure is thereby employed:

15 parts of the copolymer, having a molecular weight of about 125,000 and a specific viscosity of 01. to 0.5 mPa.s (Gantrez AN 119, made by GAF, U.S.A.) were stirred, at high speed, into 70 parts of boiling water. When the milky suspension gets clear, the dissolution is completed. Simultaneously, the viscosity is reduced. 15 parts of granulated dextrin are added to the cooled-down solution and the mixture is stirred until the dextrin has completely dissolved. The solution thus obtained can now be applied to the paper support by means of a customary application method, in a way such that the applied coating has a weight of between at least about 6 $g/m^2$ and about 15 $g/m^2$. Preferably, the dry layer weight is between about 8 and 12 $g/m^2$.

The above-mentioned components can now be arbitrarily mixed together.

Since dextrin can adversely affect a residue-free combustion, the dextrin content of the mixture according to the invention should not exceed about 50% by weight. On the other hand, the use of dextrin is advantageous, because the separation and float-up properties with respect to the separation layer and the decorative image are positively influenced by its presence. If a transfer image which is to be fixed by heat is employed, dextrin is a suitable reactant of PVE/MA.

The compositions listed in the table below are applied to a paper support which is provided with a barrier layer and dried, in amounts such that dry layer weights of 10 g/m$^2$ are obtained.

The examples illustrate the influence exerted by the various components onto the cleanness and heat-fixability of the decorative image.

TABLE

| | 1 | 2 | 3 | 4 | 5 | 6 | 7 | 8 | 9 |
|---|---|---|---|---|---|---|---|---|---|
| 1 Dextrin | 100 | 75 | 50 | 50 | 50 | 33 | 25 | — | — |
| 2 PAA | — | 25 | 50 | — | — | 33 | 25 | 100 | — |
| 3 PVE/MA | — | — | — | 50 | — | 33 | 25 | — | 100 |
| 4 PAA/PAE | — | — | — | — | 50 | — | 25 | — | — |

After application of the separation layers 1 to 9, the paper supports are coated with a lacquer mask of an acrylate lacquer burning without leaving any residues (Lacquer 83450 from Degussa) and air-dried.

For the test, the samples thus prepared are immersed in water for a short time, with their rear sides contacting the water. After 1 minute, the detached lacquer film is slid onto unglazed ceramic objects and smoothed by means of a rubber blade. The air-dried objects are then heated to 550° C., whereby the lacquer mask burns completely, and are then cooled down again.

In the compositions 1 and 2, residues of unburned separation layer are clearly recognizable. The compositions 3 to 9 do not show any signs of tinting, i.e., even at relatively low burning-in temperatures the co-transferred residues of the separation layer burn completely without carbon black particles being left.

Instead of a decorative image plus a lacquer mask, a lacquer mask is coated, in a conventional manner, onto a separation layer comprised of composition 4 and is in a customary way transferred to a plastic container (bottle) constituting the carrier. It is then exposed to a temperature of about 200° C. for 15 minutes. For comparative reasons, another plastic container is subjected to the same treatment, with the exception that the separation layer is formed by composition 1.

After cooling down, the two containers are exposed to a test solution consisting of surfactant-containing water. Whereas the lacquer mask transferred using composition 4 still resists the action of the water after 20 minutes, the lacquer mask transferred using the composition 1 as the separation layer floats on top of the water after the same period.

What is claimed is:

1. A support for transfer images or slide-off images, comprising:

an absorbent paper base layer;

a barrier layer applied to one side of the paper base layer; and a water-soluble separation layer applied to the barrier layer, wherein the separation layer comprises a mixture of a methylvinyl ether/maleic acid anhydride copolymer and dextrin.

2. A paper support as claimed in claim 1, wherein the paper layer has an average weight per unit area of from about 100 to about 200 g/m$^2$.

3. A paper support as claimed in claim 1, wherein the dry weight of the separation layer is from about 6 to about 15 g/m$^2$.

4. A paper support as claimed in claim 1, wherein the dry weight of the separation layer is from about 8 to about 12 g/m$^2$.

5. A paper support as claimed in claim 1, wherein the barrier layer comprises a coating selected from the group of starch, casein, glue, alkali metal silicate, and water glass.

6. A paper support as claimed in claim 1, wherein the separation layer comprises at least about 50% by weight of co-polymer.

7. A support for transfer images or slide-off images, comprising:

an absorbent paper base layer;

a barrier layer applied to one side of the paper base layer; and a water-soluble separation layer applied to the barrier layer, wherein the separation layer comprises a copolymer of alkylvinyl ether and maleic acid anhydride.

8. A paper support as claimed in claim 7, wherein the separation layer comprises a mixture of a methylvinyl ether/maleic acid anhydride copolymer and a polysaccharide.

* * * * *